United States Patent
Kuppusamy et al.

(10) Patent No.: US 11,151,273 B2
(45) Date of Patent: Oct. 19, 2021

(54) CONTROLLING INSTALLATION OF UNAUTHORIZED DRIVERS ON A COMPUTER SYSTEM

(71) Applicant: Microsoft Technology Licensing, LLC, Redmond, WA (US)

(72) Inventors: Manoharan Kuppusamy, Redmond, WA (US); Dhananjay Ramakrishnappa, Bengaluru (IN); Shyam Arunkundram Ramprasad, Bengaluru (IN); Priyadarshi Ghosh, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 16/154,144

(22) Filed: Oct. 8, 2018

(65) Prior Publication Data
US 2020/0110893 A1  Apr. 9, 2020

(51) Int. Cl.
G06F 21/62 (2013.01)
G06F 8/61 (2018.01)
G06F 9/4401 (2018.01)
G06F 12/14 (2006.01)
(Continued)

(52) U.S. Cl.
CPC ............ G06F 21/6227 (2013.01); G06F 8/61 (2013.01); G06F 9/4411 (2013.01)

(58) Field of Classification Search
CPC ............ G06F 21/6227; G06F 21/6281; G06F 21/629; G06F 21/62; G06F 21/51; G06F 8/61; G06F 9/4411; G06F 12/1483; G06F 12/1491; G06F 2221/2141; G06F 16/176; G06F 21/6218; H04L 63/101
See application file for complete search history.

(56) References Cited

U.S. PATENT DOCUMENTS 6,336,171 B1   1/2002  Coskrey, IV
7,167,982 B2   1/2007  Elliott et al.
(Continued)

FOREIGN PATENT DOCUMENTS

CN   107038369 A    8/2017
WO   2012154828 A1  11/2012

OTHER PUBLICATIONS

"International Search Report and Written Opinion Issued in PCT Application No. PCT/US19/53974" dated Nov. 21, 2019, 26 Pages.
(Continued)

*Primary Examiner* — Kevin Bechtel
*Assistant Examiner* — Sangseok Park
(74) *Attorney, Agent, or Firm* — Christopher J. Volkmann; Kelly, Holt & Christenson, PLLC

(57) ABSTRACT

A server kernel processing system receives an input/output (I/O) request from a user mode computing environment. The I/O request is analyzed to determine whether it is a file open request. If so, target analysis logic determines whether the file open request is for a driver file or for a file within a protected volume that stores a driven whitelist file. If the file open request is for a file stored in a protected volume, the request is blocked. If the file open request is for a driver file, then the driver whitelist file is examined to determine whether the target driver is on the whitelist. If not, the file open request is also blocked.

20 Claims, 6 Drawing Sheets

(51) Int. Cl.
*H04L 29/06* (2006.01)
*G06F 21/51* (2013.01)

(56) References Cited

U.S. PATENT DOCUMENTS

| | | | |
|---|---|---|---|
| 7,380,140 B1* | 5/2008 | Weissman | G06F 21/575 |
| | | | 709/213 |
| 8,069,487 B2 | 11/2011 | Fanton et al. | |
| 8,099,718 B2 | 1/2012 | Nagabhushan et al. | |
| 8,224,796 B1 | 7/2012 | Shinde et al. | |
| 8,291,407 B2 | 10/2012 | Greenwood et al. | |
| 8,688,734 B1 | 4/2014 | Tidd | |
| 8,726,396 B1 | 5/2014 | Dodke | |
| 8,762,738 B2 | 6/2014 | Berengoltz et al. | |
| 8,972,362 B2 | 3/2015 | Gibson et al. | |
| 9,003,104 B2 | 4/2015 | Joshi et al. | |
| 9,038,176 B2 | 5/2015 | Sallam | |
| 9,081,960 B2 | 7/2015 | Shue et al. | |
| 9,165,160 B1 | 10/2015 | Tidd | |
| 9,202,053 B1 | 12/2015 | Huang et al. | |
| 9,239,909 B2 | 1/2016 | Tedesco et al. | |
| 9,251,343 B1 | 2/2016 | Vincent et al. | |
| 9,374,390 B1 | 6/2016 | Teal et al. | |
| 9,760,715 B2 | 9/2017 | Rothwell | |
| 9,769,123 B2 | 9/2017 | Grewal et al. | |
| 2006/0150247 A1 | 7/2006 | Gafken | |
| 2008/0295174 A1 | 11/2008 | Fahmy et al. | |
| 2011/0231378 A1 | 9/2011 | Seo et al. | |
| 2012/0255017 A1 | 10/2012 | Sallam | |
| 2013/0283381 A1 | 10/2013 | Thadikaran et al. | |
| 2014/0188811 A1 | 7/2014 | Yang et al. | |
| 2014/0215196 A1 | 7/2014 | Berlin | |
| 2015/0026463 A1* | 1/2015 | Fanton | H04L 9/32 |
| | | | 713/165 |
| 2016/0378528 A1 | 12/2016 | Zamir | |
| 2018/0004972 A1 | 1/2018 | Ruggiero et al. | |
| 2018/0089430 A1 | 3/2018 | Mayo | |
| 2018/0089457 A1 | 3/2018 | Kabra et al. | |
| 2018/0102902 A1* | 4/2018 | Yang | H04L 9/0618 |
| 2018/0157834 A1 | 6/2018 | Continella et al. | |
| 2018/0217996 A1 | 8/2018 | Joshi et al. | |
| 2020/0110892 A1 | 4/2020 | Ramakrishnappa et al. | |

OTHER PUBLICATIONS

"Non Final Office Action Issued in U.S. Appl. No. 16/154,197", dated May 14, 2020, 18 Pages.

"AppLocker", Retrieved from: https://docs.microsoft.com/en-us/windows/security/threat-protection/windows-defender-application-control/applocker/applocker-overview, Oct. 16, 2017, 5 Pages.

"Code signing for device drivers", Retrieved from: https://msdn.microsoft.com/en-us/library/ms811949.aspx, Jan. 6, 2010, 1 Page.

"Driver Radar Pro v1.8", Retrieved from: https://www.novirusthanks.org/products/driver-radar-pro/, Aug. 27, 2018, 4 Pages.

"Secure boot feature signing requirements for kernel-mode drivers", Retrieved from https://docs.microsoft.com/en-us/windows/desktop/w8cookbook/secured-boot-signing-requirements-for-kernel-mode-drivers, Jun. 20, 2017, 2 Pages.

"what is File System Filter Drivers", Retrieved from: http://www.easefilter.com/forums/viewtopic.php?f=6&t=187&p=191, Sep. 26, 2013, 1 Page.

"Non Provisional Application as Filed in U.S. Appl. No. 15/635,199", filed Jun. 28, 2017, 39 Pages.

Cochlin, James, "SAP Indirect Access Explained", Retrieved from: https://www.jncconsultancy.com/sap-indirect-access-explained/, Feb. 2, 2018, 10 Pages.

Stroshane, Matt, "File System Minifilter Drivers", Retrieved from: https://docs.microsoft.com/en-us/windows-hardware/drivers/its/file-system-minifilter-drivers, Apr. 20, 2017, 2 pages.

"International Search Report and Written Opinion Issued in PCT Application No. PCT/US19/052538", dated Dec. 9, 2019, 12 Pages.

"Final Office Action Issued in U.S. Appl. No. 16/154,197", dated Nov. 12, 2020, 16 Pages.

"seccomp", retrieved at: "https://en.wikipedia.org/wiki/Seccomp", retrieved on: Feb. 24, 2021, 3 pages.

"index : linux/kernel/git/tglx/history.git", retrieved at: "https://archive.is/20130415050745/http://git.kernel.org/?p=linux/kernel/git/tglx/history.git;a=commit;h=d949d0ec9c601f2b148bed3cdb5f87c052968554", retrieved on: Feb. 24, 2021, bearing an index date of Apr. 15, 2013, 8 pages.

"WhiteEgret: New Linux Security Module For Execution Whitelisting", bearing a date of May 30, 2017, retrieved at "https://www.phoronix.com/scan.php?page=news_item&px=WhiteEgret-Linux-Security", retrieved on: Feb. 24, 2021, 5 pages.

"seccomp", retrieved at: "https://web.archive.org/web/20181006080517/https://en.wikipedia.org/wiki/Seccomp", bearing an index date of Oct. 6, 2018, accessed on Feb. 23, 2021, 4 pages.

"WhiteEgret: New Linux Security Module For Execution Whitelisting", retrieved at: "https://web.archive.org/web/20180625155259/https://www.phoronix.com/scan.php?page=news_item&px=WhiteEgret-Linux-Security", bearing an index date of Jun. 25, 2018, accessed on Feb. 23, 2021, 4 pages.

\* cited by examiner

CONTROLLING INSTALLATION OF UNAUTHORIZED DRIVERS ON A COMPUTER SYSTEM

BACKGROUND

Computer systems are currently in wide use. Some such computer systems include data centers.

Data centers are formed of large groups of networked computer servers that can be used in a wide variety of different ways. They are often used by businesses or other organizations in order to store, process and disseminate large amounts of information.

Some data centers also host or serve applications, such as electronic mail applications, instant messaging applications, electronic commerce transactions, and a wide variety of others. Similarly, some data centers can store and serve websites to users who access the data centers.

It is not uncommon for multiple different organizations to use the resources on a single data center. Such data centers may include a large number of different server machines that provide the desired access.

Data security for data in a data center is widely considered to be an important feature. Different degrees of security can be obtained by using various forms of data encryption and various forms of authentication.

The discussion above is merely provided for general background information and is not intended to be used as an aid in determining the scope of the claimed subject matter.

SUMMARY

A server kernel processing system receives an input/output (I/O) request from a user mode computing environment. The I/O request is analyzed to determine whether it is a file open request. If so, target analysis logic determines whether the file open request is for a driver file or for a file within a protected volume that stores a driver whitelist file. If the file open request is for a file stored in a protected volume, the request is blocked. If the file open request is for a driver file, then the driver whitelist file is examined to determine whether the target driver is on the whitelist. If not, the file open request is also blocked.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
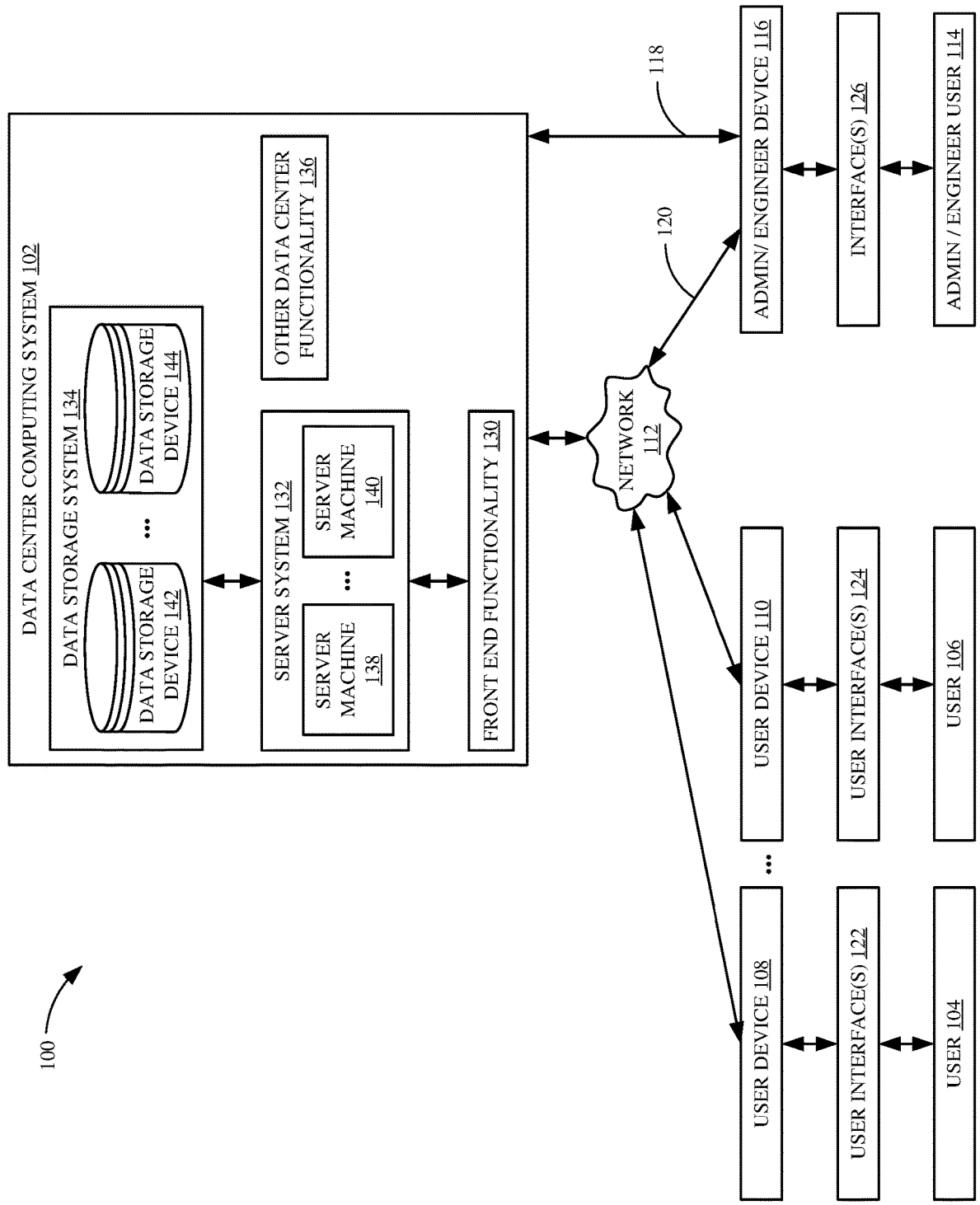
FIG. 1 is a block diagram of one example of a computing system architecture.

FIG. 1 is a block diagram of one example of a computing system architecture 100. Architecture 100 shows data center computing system 102 that can be accessed by a plurality of users 104-106 using user devices 108-110, over network 112. FIG. 1 also shows that an administrator or engineer 114 can access data center computing system 102 using an administrative/engineer device 116. Administrator/engineer 114 can access computing system 102 either directly, as indicated by arrow 118, or through network 112, as indicated by arrow 120.

In the example shown in FIG. 1, user devices 108-110 are shown generating user interfaces 122-124, for interaction by users 104-106, respectively. Users 104-106 interact with their respective user interfaces 122-124 in order to control and manipulate the corresponding user devices 108-110 and some portions of data center computing system 102.

Similarly, device 116 is shown generating interfaces 126 for interaction by user 114. User 114 illustratively interacts with interfaces 126 in order to control and manipulate device 116 and some portions of data center computing system 102. Users 104-106 illustratively access resources (such as data storage, hosted services, and other resources) provided by the data center computing system 102.

Network 112 can be any of a wide variety of different types of networks. For instance, it can be a wide area network, a local area network, a near field communication network, a cellular network, or any of a wide variety of other networks or combinations of networks.

Administrator/engineer 114 illustratively performs administrative or engineering operations on data center computing system 102. Therefore, user 114 can gain access to certain portions of data center computing system 102 to perform maintenance operations, to deploy code to fix bugs, to deploy new features, or perform other operations. In order to do so, user 114 is often provided with authentication information or security credentials that allow him or her to access various portions of computing system 102, that are not otherwise accessible.

FIG. 1 shows that, in one example, data center computing system 102 illustratively includes front end functionality 130, server system 132, data storage system 134, and it can include a wide variety of other data center functionality 136. Server system 132 includes a plurality of different server machines 138-140. Data storage system 134 illustratively includes a plurality of different data storage devices 142-144.

Briefly, in operation, front end functionality 130 illustratively receives requests from various users 104-106 that use resources and services hosted by data center computing system 102, and provides those requests to server system 132. Server machines 138-140 illustratively process the requests so that the users 104-106 can manipulate or access data stored in data storage system 134, and specifically on the different data storage devices 142-144. The result of the requests received by front end functionality 130 can be returned to front end functionality 130 by server system 132. Front end functionality 130 can then return the results of the requested operations to the users who requested them.

There are a variety of different types of security systems or techniques that can be deployed to protect data and other items in data center computing system 102. For instance, users 104-106 can be required to provide authentication information in order to access different information. Similarly, administrative/engineer user 114 may be required to provide certain security credentials. In addition, where user 114 wishes to deploy code on data center computing system 102, user 114 may be required to have the code signed or otherwise authenticated or verified before it can be deployed to data center computing system 102.

As an example, user 104 may provide an input/output (I/O) request to perform some operation with respect to data stored in data storage device 142. Engineering user 114 may deploy a piece of code to the kernel of server machine 138 that is intended to perform operations in carrying out the I/O request. In one example, the logic deployed by engineering user 114 can perform management operations on the I/O request, such as creating a file, opening a file or document, closing a file, deleting a file, enumerating files, reading and writing file data, etc.

As a specific example, where the data in data storage devices 142-144 is arranged according to a file system and directories, the code that is deployed by user 114 in order to assist with the management of I/O operations may be known as a filter driver. Filter drivers attach to a memory volume or file system and are loaded into a driver stack corresponding to the volume or file system. When an I/O request is received for that volume or file system, it is forwarded to the correct file system or volume by a piece of I/O management logic.

A driver stack attached to that file system or volume includes the drivers that are loaded for the corresponding file system or volume, and the I/O request is provided to the drivers in that driver stack. Those drivers can include filter drivers that may modify the behavior of the file system to which they are attached, when responding to an I/O request. The filter drivers are kernel-mode components meaning that they are executed by the kernel computing system for a particular server machine. The kernel computing system executes a kernel program that is part of the operating system, which manages I/O requests from customer mode components, such as applications. The kernel is loaded on the startup of the computing system and can manage a remainder of the startup operations.

It will be appreciated that, while some examples are described herein in terms of the information in the data storage devices 142-144 being arranged as files in a file system hierarchy, or directory, that need not be the case. Instead, they can be stored in other ways as well. Similarly, while some portions of the present description proceed with respect to file system drivers, driver stacks, and the like, those need not be used either. In other examples, instead of being a file system driver (or filter driver) in a driver stack corresponding to a file system, the operations may be performed by data accessing code that resides in a data accessing system that receives an I/O request from a user mode component and processes it, within the kernel of the server machine, without making use of a "driver", a "filter driver", etc. Instead, the code is simply executed as a separate component in the data accessing system. Different types of examples will be described herein. They are to be considered as examples only, and not limiting the scope of the present discussion.

Regardless of the particular configuration of the architecture 100, it may be that an administrative or engineering user 114 may wish to perform malicious operations on data center computing system 102. Because user 114 has the credentials to have a driver or other data accessing logic signed or otherwise authenticated to data center computing system 102, user 114 can, in certain circumstances, deploy a malicious driver or another piece of malicious data accessing code to data center computing system 102. Computing system 102 may not recognize it as being malicious because it may contain the appropriate signature or other authentication information.

Thus, as is described below, the present description describes a server kernel processing system in the kernel of server machines 138-140 that reduces the likelihood that this will happen. In order to deploy or install a piece of code on data center computing system 102 (whether it is a driver or another piece of data accessing code), the code is provided as a file, and the file must be opened before it is deployed or installed. Therefore, in one example, as is discussed below, the present description modifies the kernel of server machines 138-140 so that they include a system that intercepts all file open calls and determines whether the file open call is directed to a driver file. If it is, the identity of the driver file is compared against a whitelist mechanism (e.g., a whitelist file) that contains entries identifying authorized driver files. If the target driver file (the driver file to be opened) is not on the whitelist, then the file open call is blocked.

The present description also proceeds with respect to a system that protects the whitelist in the same way. The whitelist will illustratively be stored in a protected volume on one of data storage devices 142-144. Therefore, if a user 114 is attempting to modify the whitelist so that includes an entry for the malicious driver or other file to be installed, then the I/O operation will have, as a target file to be opened, the whitelist. Thus, the present description provides a system which determines whether the file open operation is to be performed on a file within the protected volume. If so, again, the file open operation is blocked. Thus, the present system protects data stored in data storage system 134 from corruption by a malicious driver (because the malicious driver will not be allowed to be installed) and it also protects the whitelist in the same way (because the whitelist will be stored in a protected volume where no file open operations are to be executed, except by the system itself).

Figure 2:
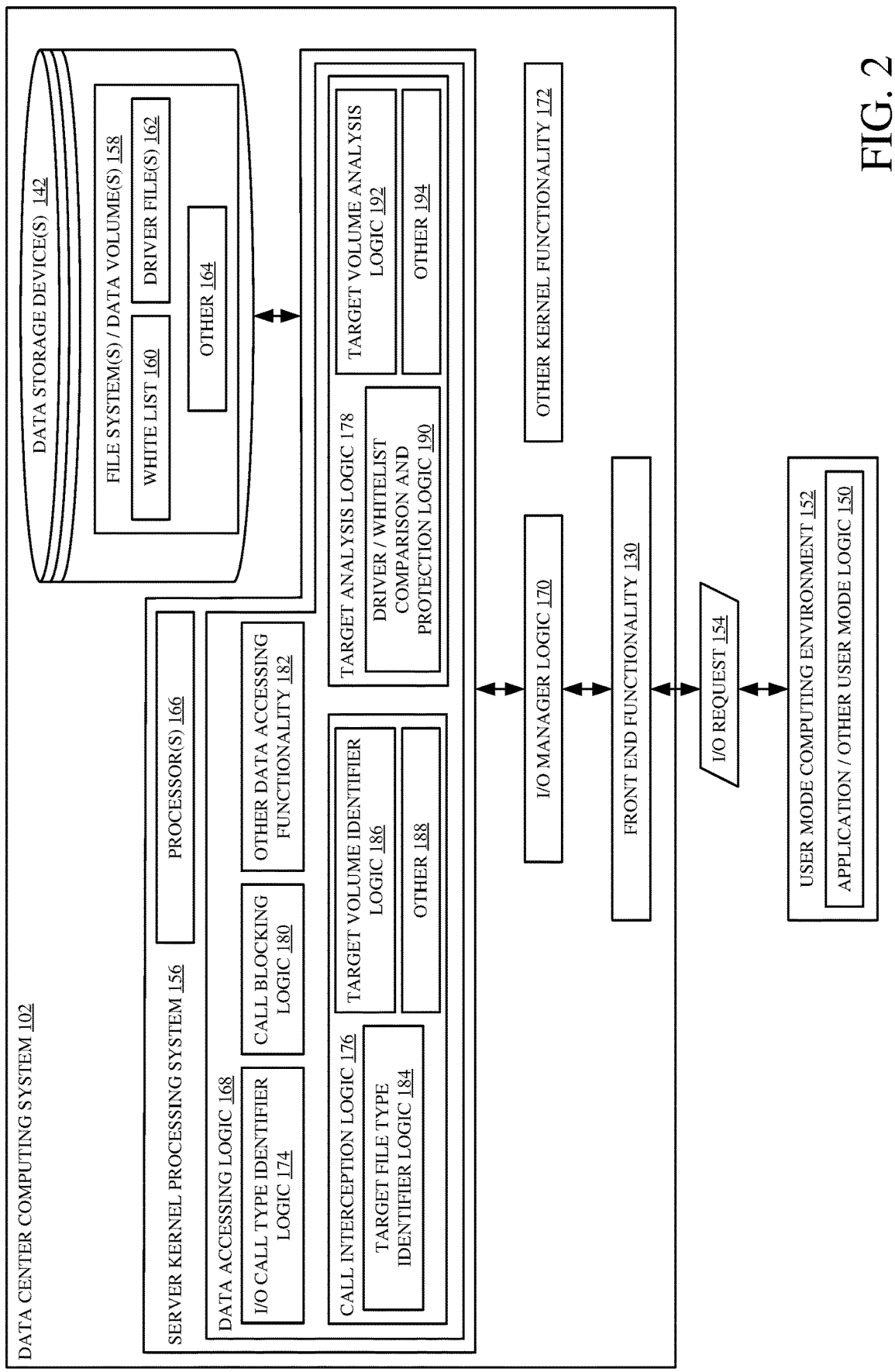
FIG. 2 is a block diagram showing one example of portions of the computing system architecture illustrated in FIG. 1, in more detail.

FIG. 2 is a more detailed block diagram of one example of a portion of the computing system architecture 100 shown in FIG. 1. Some items are similar to those shown in FIG. 1, and they are similarly numbered. In the example shown in FIG. 2, an application or other user mode logic 150 resides in a user mode computing environment 152 (which may be on one of user devices 108-110 or elsewhere). Application/logic 150 generates an I/O request 154 that is provided through front end logic 130 to server machine 138. In the example shown in FIG. 2, server machine 138 includes server kernel processing system 156 and it can include a wide variety of other server functionality 158. Server kernel processing system 156 processes the I/O request 154 and, if authorized, accesses data on one of data storage devices 142. The data can be stored in a file system or in another data volume as indicated by block 158. The data to be accessed may include a whitelist file 160, a driver file 162, or a wide variety of other information 164.

In the example shown in FIG. 2, server kernel processing system 156 illustratively includes one or more processors 166, data accessing logic 168, I/O manager 170, and it can include a wide variety of other kernel functionality 172. Data accessing logic 168 can include I/O call type identifier logic 174, call interception logic 176, target analysis logic 178, call blocking logic 180, and it can include a wide variety of other data accessing functionality 182. In the example illustrated, call interception logic 176 includes target file type identifier logic 184, target volume identifier logic 186, and it can include other items 188. Target analysis logic 178 can include driver/whitelist comparison and protection logic 190, target volume analysis logic 192, and it can include other items 194.

In operation, the application/logic 150 may generate the I/O request 154 as a file open request, a file write request, a read request, a file create request, a file delete request or a wide variety of other requests that may be issued to access information on data storage devices 142. It will be noted that all of these and other requests rollup into a file open request, so the protection discussed herein applies to all of these file I/O operations (or requests). Front end functionality 130 illustratively exposes an interface for receiving request 154 and provides the request to I/O manager logic 170. There may be a variety of different instances of data accessing logic 168 on server machine 138. I/O manager logic 170 routes the I/O request 154 to the proper set of data accessing logic 168 for processing. When data accessing logic 168 receives I/O request 154, then I/O call type identifier logic 174 identifies the type of the call (or I/O request) that is being made. For instance, as discussed above, it may be a file open request, a create request, a read request, a write request, etc.

In one example, if the I/O request is a file open request, requesting to open a target file, then target file type identifier logic 184 determines what type of file the target is. As an example, the file may be a driver file (or a similar file). Target volume identifier logic 186 also identifies the target volume (or memory location) where the target file resides.

Target analysis logic 178 then analyzes the target to be accessed to determine whether the file open call should be blocked. For instance, if the target file has been identified by logic 184 as a driver file, then driver/whitelist comparison and protection logic 190 accesses whitelist 160, which contains a list of all authorized drivers, that are authorized to be installed on the data center (or at least on server machine 138). If the target file (e.g., the target driver file to be opened) is identified on whitelist 160 as an authorized driver file, then target analysis logic 178 generates an authorization output indicating the driver is authorized, and the target driver file 162 can be opened.

If, however, comparison and protection logic 190 determines that the target driver file is not identified as an authorized driver file on whitelist 160, then it generates an unauthorized output indicative of this and the I/O operation (or the file open call) is blocked by call blocking logic 180. Logic 180 may return a message to the calling user mode component. It may provide a message to a security engineer, or other person, or it may perform other operations as well.

In this way, if an engineering user 114 obtains a valid signature on malicious driver, then, when attempting to install the driver, the corresponding driver file must be opened. However, if the corresponding driver file is not authorized (because it is not identified on whitelist 160), then the file open call to open the target driver file will be blocked and it will not be opened. Thus, it cannot be installed. This prevents the malicious activity which would otherwise be performed by the driver file.

It may also be, however, that engineering user 114 wishes to access the whitelist 160 to add an entry identifying the malicious driver file in order to bypass the security performed by data accessing logic 168. Therefore, if target file identifier logic 184 determines that the target file of the file open request is not a driver file, the target volume identifier logic 186 identifies the storage volume (or memory location) where the target file is stored. In one example, whitelist 160 will be stored in a protected volume (or in a protected range of memory locations).

Target volume analysis logic 192 then determines whether the location of the file to be opened is stored within the protected volume (or protected range of memory locations). If the target file is in that protected range (which would include whitelist 160), then logic 192 provides an output indicating this to call blocking logic 180, and call blocking logic 180 blocks the I/O request (or file open call). In this way, an engineering user 114 is prohibited from modifying the whitelist 160 to contain an identifier for the malicious driver that user 114 is attempting to install. The same mechanism (data accessing logic 168) thus protects against both installing a malicious driver, and accessing the whitelist 160.

Figure 3:
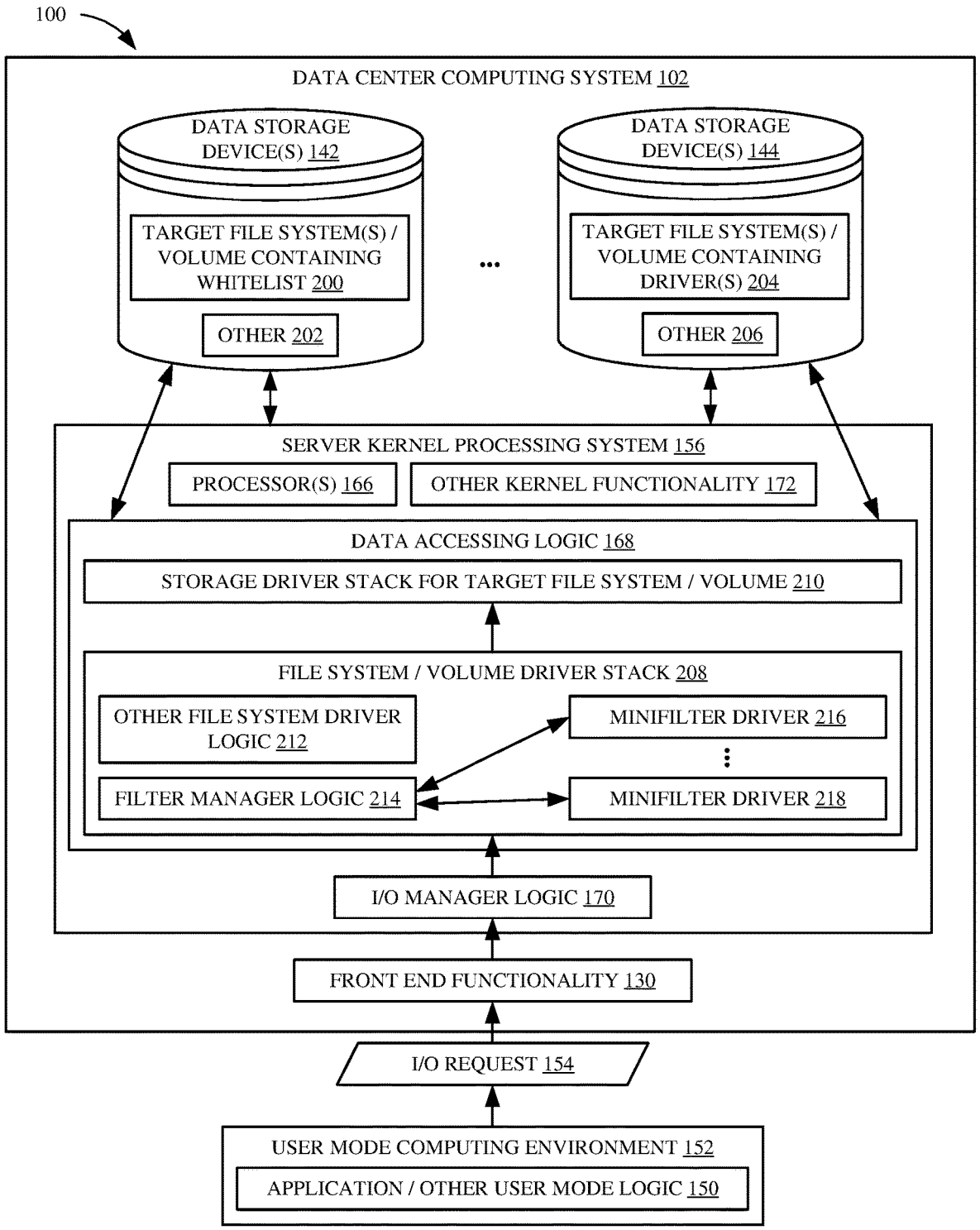
FIG. 3 is a block diagram showing another example of portions of the computing system architecture illustrated in FIG. 1, in more detail.

FIG. 3 is a block diagram showing another example of architecture 100. Some items are similar to those shown in FIGS. 1 and 2, and they are similarly numbered. In the example shown in FIG. 3, data is stored in data storage devices 142-144 in various file systems. Thus, data storage device 142 is shown storing a file system/volume that contains the whitelist. This is indicated by block 200. It can store other items 202 as well. Data storage device 144 is shown storing a file system/volume that contains one or more driver files. This is indicated by block 204. Device 144 can store other items 206 as well.

In the example shown in FIG. 3, data accessing logic 168 includes file system/volume driver stack 208, and storage driver stack for the target file system/volume that is the target of I/O request 154. The storage driver stack for the target file system or volume is indicated by block 210.

There may be a plurality of different driver stacks that are attached to different file systems or volumes. Therefore, when I/O request 154 is received, I/O manager logic 170 identifies the particular file system or volume that is the subject of the I/O request, and forwards the I/O request to the driver stack attached to that file system or volume. In the example shown in FIG. 3, I/O manager logic 170 forwards the I/O request 154 to the file system/volume driver stack 208. Driver stack 208 can include a wide variety of different drivers. Some file system drivers or driver logic is indicated by block 212. It can also include filter drivers which modify the I/O request or perform processing on the I/O request that is received. In some cases, some filter driver logic is shared among different filter drivers. In that case, filter manager logic 214 may support a plurality of different minifilter drivers 216-218. Logic 214 includes the common functionality for the minifilter drivers supported by filter manager logic 214. The minifilter drivers 216-218, themselves, include additional logic thus performing different filtering steps. The location of the filter drivers (e.g., minifilter drivers 216-218 among the other file system drivers 212 in driver stack 208) can be specified or it can be determined based on the order of loading the drivers.

File system/volume driver stack 208 receives the I/O request and passes it to filter manager logic 214. Filter manager logic 214 illustratively receives the I/O request and provides it for operation by minifilter drivers 216-218 in an order determined by their order within stack 208. Once the minifilter drivers 216-218, which are attached to filter manager logic 214, have executed on the I/O request 154, the result can be provided to other file system driver logic 212. The resultant I/O request (after all filter drivers and minifilter drivers in stack 208 have operated on it) is then provided to the storage driver stack for the particular data storage device 142-144 where the target file resides. For instance, if the I/O request is to operate on a file within data storage device 142, then the I/O request is provided from driver stack 208 to the storage driver stack for storage device 142. This is an example only.

In the example shown in FIG. 3, a minifilter driver 216 is provided to determine whether the I/O request 154 is a file open request for a driver file. If it is, then minifilter driver 216 accesses the whitelist in data storage device 142 to determine whether the target driver file is authenticated by the whitelist. If not, minifilter driver 216 blocks the file open request (the I/O request 154) from being executed. However, if the target driver file is on the whitelist, then minifilter driver 216 provides an authorization output indicating that the operation may be performed.

Minifilter driver 218 (if minifilter driver 216 determines that the target file is not a driver file) then determines whether the target file (which is the subject of I/O request 154) resides in a protected volume. If it does, then minifilter driver 218 blocks the I/O request from being executed. It will also be noted that a single minifilter driver can perform several of these operations as well. For example, a single minifilter driver can both check to see whether the target is a driver file and whether the target resides in a protected volume. This is just one example.

In this way, minifilter driver 216 ensures that a user is unable to install a malicious driver. Similarly, minifilter driver 218 ensures that a user is unable to modify the whitelist.

Figure 4:
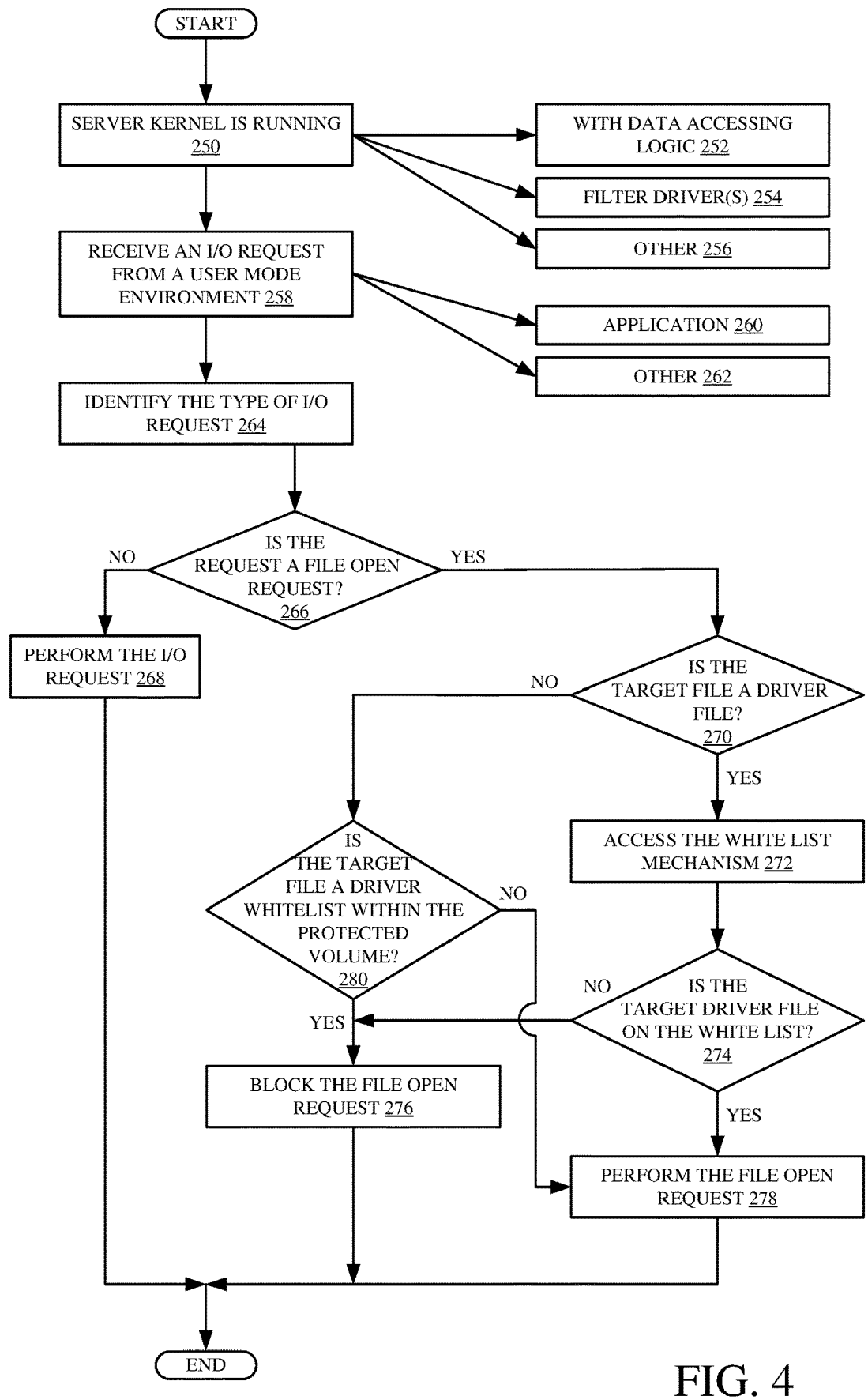
FIG. 4 is a flow diagram illustrating one example of the operation of a server kernel processing system in processing an input/output (I/O) request.

FIG. 4 is a flow diagram illustrating one example of the operation of data access logic 168 (two examples of which are shown in FIGS. 3 and 4) in determining whether an I/O request 154 is attempting to open a driver file where the driver is not identified on the whitelist, or where the I/O request 154 is attempting to open a file in a protected volume (e.g., is attempting to open and modify the whitelist). It is first assumed that a server kernel is running in a server kernel processing system 156. This is indicated by block 250 in the flow diagram of FIG. 4. It is also assumed that the kernel has data accessing logic as well. This is indicted by block 252. In one example, the data accessing logic can be similar to that shown in FIG. 2, where it can access data stored in a flat file system, or according to a hierarchal directory, or in other ways. In another example, data accessing logic 168 can be similar to that shown in FIG. 3, where a driver stack is used to process I/O requests 154 and to modify the operation of the kernel in response to different I/O requests. The driver stack can include filter drivers, minifilter drivers or a wide variety of other drivers as well. This is indicated by block 254.

The data accessing logic can also take a wide variety of other forms. This is indicated by block 256. Those illustrated in FIGS. 2 and 3 are illustrated for the sake of example only.

The data accessing logic 168 then receives an I/O request 154 from the user mode computing environment 152. This is indicated by block 258 in the flow diagram of FIG. 4. The I/O request 154 can be from an application or other user mode logic 150. Receiving an I/O request 154 from a user mode application is indicated by block 260. Receiving it from other user mode logic is indicated by block 262.

Once the I/O request 154 is received, then data accessing logic 168 determines the type of I/O request. For instance, in FIG. 2, I/O call type identifier logic 174 determines whether the I/O request is a file open request, a file open/ write request, etc. In FIG. 3, a minifilter driver 216-218 or other file system driver can make this determination. Identifying the type of the I/O request 154 is indicated by block 264 in the flow diagram of FIG. 4.

If the request is not a file open request, as indicated by block 266, then data accessing logic 168 performs any other operations on the I/O request and then passes it on to the data storage device so that it can be executed. Executing the I/O request is indicated by block 268 in the flow diagram of FIG. 4.

However, if, at block 266, it is determined that the I/O request 154 is a file open request, then data accessing logic 168 determines whether the target file (which is the target of the file open request) is a driver file. This is indicted by block 270 in the flow diagram of FIG. 4.

If, at block 270, it is determined that the target file (of the file open request) is indeed a driver file, then data accessing logic 168 accesses the whitelist which includes entries identifying the driver files that are authorized to be on the server machine. Accessing the whitelist mechanism is indicated by block 272 in the flow diagram of FIG. 4. In one example, target file identifier logic 184 identifies the target file (to see whether it is a driver), and driver/whitelist comparison logic 190 determines whether the target driver file is identified on the whitelist. In another example, minifilter drivers 216-218 identify the type of target file to determine whether it is a driver, and if so, access the whitelist to determine whether the target driver file is identified on the whitelist.

If, at block 274, it is determined that the target driver file is not on the whitelist, then data accessing logic 168 blocks the file open request, so that it cannot be performed. This is indicated by block 276. In this way, if a surreptitious user is attempting to install a malicious driver, that action will be blocked.

If, at block 274, it is determined that the target driver file that is the subject of the file open request is, in fact, identified as an authorized driver on the whitelist, then data accessing logic 168 provides the I/O request 154 to any other processing logic that is used to execute the I/O request 154. Executing the file open request (after determining that the target driver file is on the whitelist) is indicated in block 278 in the flow diagram of FIG. 4.

Returning to block 270, if it is determined that the target file is not a driver file, then data accessing logic 168 determines whether the target file is in a protected volume (or a protected range of memory locations) on data storage devices 142-144. For instance, it may be that a malicious user is attempting to modify the whitelist stored in the protected volume. Determining whether the target file is a driver whitelist file in a protected volume is indicated by block 280 in the flow diagram of FIG. 4. If so, then processing again proceeds to block 276 where the I/O request 154 is blocked so that the file in the protected volume cannot be opened and/or otherwise modified.

If, at block 280, it is determined that the target file is not a driver whitelist file in the protected volume, then processing proceeds to block 278 where data accessing logic 168 performs any other operations on the I/O request 154 that are needed to execute it or perform it, or to submit it for further processing.

It can thus be seen that the present description greatly enhances the security of the computing system itself. It intercepts all file open requests for system files, and determines whether the target file is a driver. If so, it only permits the file open request to proceed if the driver is authorized by the whitelist mechanism. If it is not, the file open request is blocked. Similarly, even if the file open request is not directed to a driver file, the system determines whether the target file is in a protected volume (e.g., the whitelist). If so, again the I/O request is blocked so that the whitelist cannot be modified. By using the same mechanism to protect the system from both having a malicious driver installed, and having the whitelist modified, the mechanism is efficient yet provides a significantly enhanced level of security.

It will be noted that parts of the above discussion herein have described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
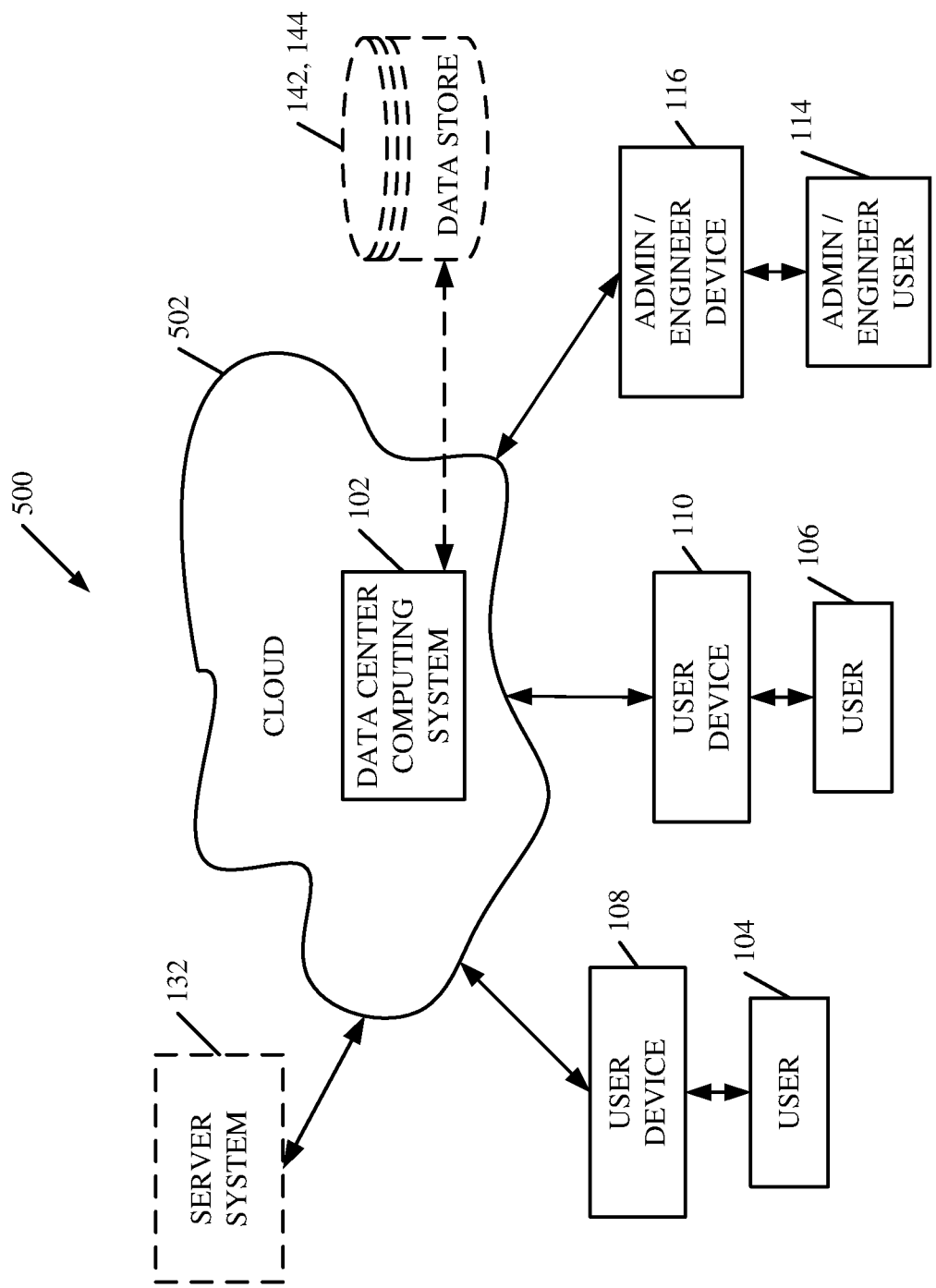
FIG. 5 is a block diagram showing the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that data center computing system 102 can be located in cloud 502 (which can be public, private, or a combination where portions are public while others are private). Therefore, users 104, 106, 114 use a user devices 108, 110, 116 to access those systems through cloud 502.

FIG. 5 also depicts another examples of a cloud architecture. FIG. 5 shows that it is also contemplated that some elements of computing system 102 can be disposed in cloud 502 while others are not. By way of example, data stores 142, 144 can be disposed outside of cloud 502, and accessed through cloud 502. In another example, system 132 (or other items) can be outside of cloud 502. Regardless of where they are located, they can be accessed directly by devices 108, 110, 116, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
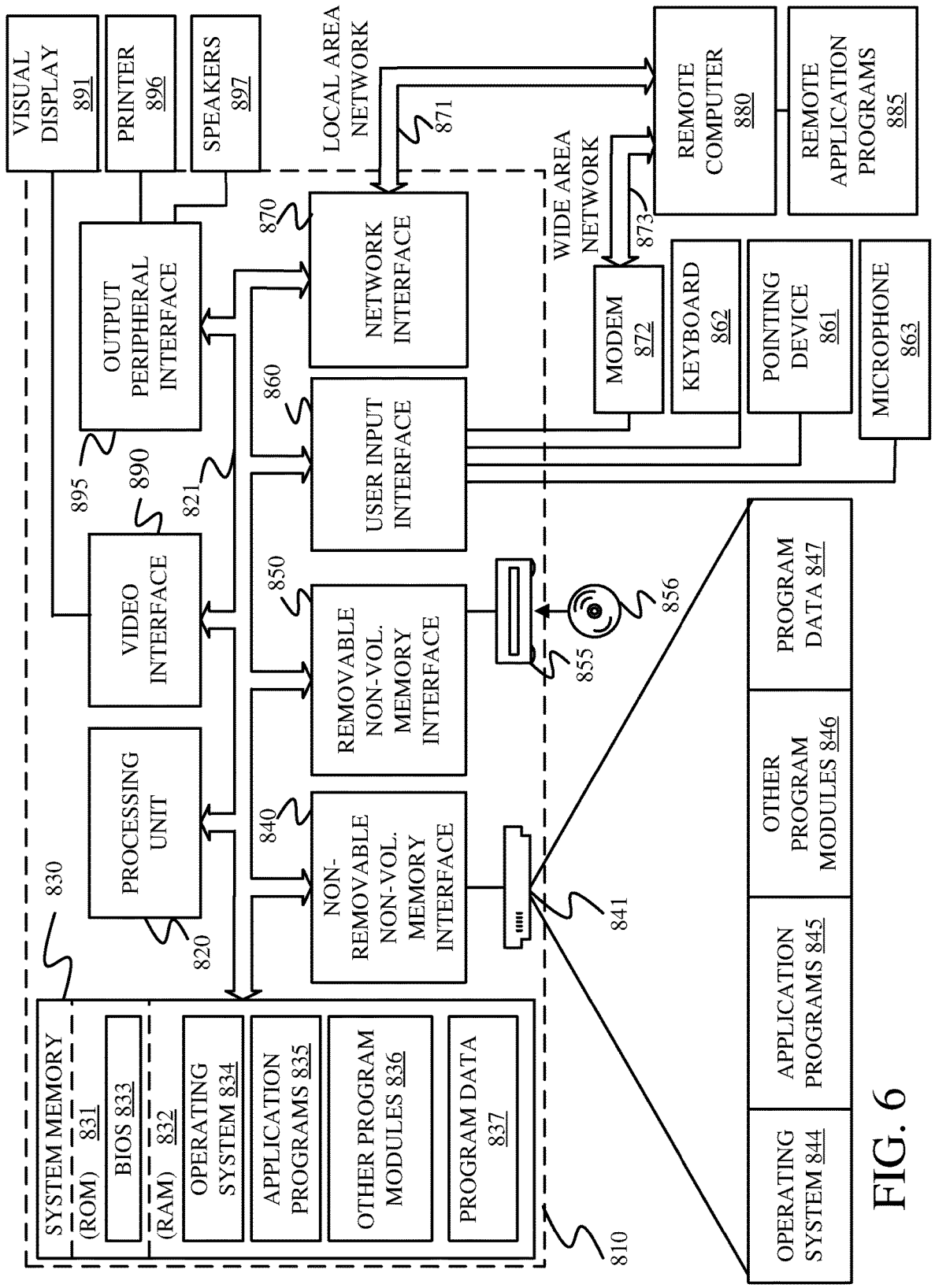
FIG. 6 is a block diagram showing one example of a computing environment that can be used in the architectures shown in the previous figures.

FIG. 6 is one example of a computing environment in which architecture 100, or parts of it, (for example) can be deployed. With reference to FIG. 6, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

Example 1 is a computing system, comprising:

data accessing logic, in a server kernel, that receives a request to perform an operation on data stored on a data storage device;

call interception logic, in the server kernel, that intercepts the request before the request is executed and that, if the request is a file open request to open a target file, determines whether the target file is a driver file and, if the target file is not a driver file, identifies a storage location where the target file is stored;

target analysis logic, in the server kernel, that, if the target file is a driver file, determines whether the driver file is authorized by a whitelist file and, if the target file is not a driver file, determines whether the storage location is in a protected location that includes the whitelist file; and call blocking logic that, if the target file is a driver file that is not authorized by the whitelist file, blocks the request from being executed, and if the target file is not a driver file but is stored in the protected location, blocks the request from being executed.

Example 2 is the computing system of any or all previous examples and further comprising:

call type identifier logic, in the server kernel, configured to identify whether the request is the file open request to open the target file.

Example 3 is the computing system of any or all previous examples wherein the call interception logic comprises:

target file type identifier logic configured to identify a type of the target file to determine whether the target file is a driver file.

Example 4 is the computing system of any or all previous examples wherein the call interception logic comprises:

target volume identifier logic configured to identify the storage location where the target file is stored.

Example 5 The computing system of any or all previous examples wherein the target analysis logic comprises:

driver/whitelist comparison and protection logic configured to, if the target file type identifier logic identifies that the target file is a driver file, access the whitelist file and compare a driver file identifier that identifies the driver file with entries in the whitelist file to determine whether the driver file identifier is identified by an entry in the whitelist file and, if so, generate an authorization output indicating that the driver file is authorized by the whitelist file.

Example 6 is the computing system of any or all previous examples wherein the target analysis logic comprises:

target volume analysis logic configured to, if the target file type identifier logic does not identify the target file as a driver file, compare a storage location of the target file to a range of storage locations that comprise the protected volume, to determine whether the storage location of the target file is in the protected volume and, if not, generate an authorization output indicating that the target file is not stored in the protected volume.

Example 7 is the computing system of any or all previous examples wherein the request is to access a file in a file system, with an attached driver stack of loaded filter drivers that are loaded into the server kernel, for execution by the server kernel.

Example 8 is the computing system of any or all previous examples wherein the call interception logic comprises a filter driver in the driver stack attached to the file system.

Example 9 is the computing system of any or all previous examples wherein the call target analysis logic comprises a filter driver in the driver stack attached to the file system.

Example 10 is the computing system of any or all previous examples wherein the call blocking logic comprises a filter driver in the driver stack attached to the file system.

Example 11 is a computer implemented method, comprising:

receiving a request, in a server kernel, to perform an operation on data stored on a data storage device;

identifying, before the request is executed, whether the request is a file open request to open a target file;

if so, determining whether the target file is a driver file;

if the target file is not a driver file, identifying a storage location where the target file is stored;

if the target file is a driver file, determining whether the driver file is authorized by a whitelist file;

if the target file is not a driver file, determining whether the storage location is in a protected location that includes the whitelist file;

if the target file is a driver file that is not authorized by the whitelist file, blocking the request from being executed; and if the target file is not a driver file but is stored in the protected location, blocking the request from being executed.

Example 12 is the computer implemented method of any or all previous examples and further comprising:

identifying, in the server kernel, whether the request is the file open request to open the target file.

Example 13 is the computer implemented method of any or all previous examples wherein determining whether the driver file is authorized by a whitelist file comprises:

if the target file is a driver file, accessing the whitelist file;

comparing a driver file identifier, that identifies the driver file, with entries in the whitelist file to determine whether the driver file identifier is identified by an entry in the whitelist file; and if so, generating an authorization output indicating that the driver file is authorized by the whitelist file.

Example 14 is the computer implemented method of any or all previous examples wherein determining whether the storage location is in a protected location that includes the whitelist file comprises:

if the target file is not identified as a driver file, comparing a storage location of the target file to a range of storage locations that comprise the protected volume, to determine whether the storage location of the target file is in the protected volume; and if not, generating an authorization output indicating that the target file is not stored in the protected volume.

Example 15 is the computer implemented method of any or all previous examples wherein the request is to access a file in a file system, with an attached driver stack of loaded filter drivers that are loaded into the server kernel, for execution by the server kernel.

Example 16 is the computing system of any or all previous examples wherein determining whether the target file is a driver file comprises:

providing the request to a filter driver in the driver stack attached to the file system; and executing the filter driver.

Example 17 is the computer implemented method of any or all previous examples wherein identifying a storage location where the target file is stored, determining whether the driver file is authorized by a whitelist file, and determining whether the storage location is in a protected location that includes the whitelist file comprises:

providing the request to a filter driver in the driver stack attached to the file system; and executing the filter driver.

Example 18 is a computing system, comprising:
data accessing logic, in a server kernel, that receives a request to perform an operation on data stored on a data storage device;
call type identifier logic, in the server kernel, configured to identify whether the request is a file open request to open the target file;
target file type identifier logic configured to, if the request is a file open request, intercept the request before the request is executed, and identify a type of the target file to determine whether the target file is a driver file;
target volume identifier logic configured to identify the storage location where the target file is stored;
target analysis logic, in the server kernel, that, if the target file is a driver file, determines whether the driver file is authorized by a whitelist file and, if the target file is not a driver file, determines whether the storage location is in a protected location that includes the whitelist file; and
call blocking logic that, if the target file is a driver file that is not authorized by the whitelist file, blocks the request from being executed, and if the target file is not a driver file but is stored in the protected location, blocks the request from being executed.

Example 19 is the computing system of any or all previous examples wherein the target analysis logic comprises:
driver/whitelist comparison and protection logic configured to, if the target file type identifier logic identifies that the target file is a driver file, access the whitelist file and compare a driver file identifier that identifies the driver file with entries in the whitelist file to determine whether the driver file identifier is identified by an entry in the whitelist file and, if so, generate an authorization output indicating that the driver file is authorized by the whitelist file.

Example 20 is the computing system of any or all previous examples wherein the target analysis logic comprises:
target volume analysis logic configured to, if the target file type identifier logic does not identify the target file as a driver file, compare a storage location of the target file to a range of storage locations that comprise the protected volume, to determine whether the storage location of the target file is in the protected volume and, if not, generate an authorization output indicating that the target file is not stored in the protected volume.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
at least one processor; and
memory storing instructions executable by the at least one processor, wherein the instructions provide in a server kernel:
data accessing logic configured to receive a request to perform an operation on data stored on a data storage device;
call interception logic configured to:
intercept the request before the request is executed; and
based on a determination that the request is a file open request to open a target file and a determination that the target file is not a driver file that stores code configured to deploy a driver on the computing system, identify a storage location where the target file is stored;
target analysis logic configured to:
determine the storage location is in a protected location including a whitelist file that stores a set of entries that identify a set of authorized driver files; and
call blocking logic configured to block the request from being executed based on the determination that the storage location is in the protected location.

2. The computing system of claim 1 wherein the instructions provide in the server kernel:
call type identifier logic configured to identify that the request is the file open request to open the target file.

3. The computing system of claim 2 wherein the call interception logic comprises:
target file type identifier logic configured to identify a type of the target file and determine whether the target file is a driver file based on the identified type.

4. The computing system of claim 3 wherein the call interception logic comprises:
target volume identifier logic configured to identify the storage location where the target file is stored.

5. The computing system of claim 4 wherein the target analysis logic comprises:
driver/whitelist comparison and protection logic configured to access the whitelist file and compare a driver file identifier that identifies the driver file with the set of entries in the whitelist file to determine whether the driver file identifier is identified by an entry in the whitelist file and generate an authorization output indicating that the driver file is authorized by the whitelist file.

6. The computing system of claim 5 wherein the target analysis logic comprises:
target volume analysis logic configured to compare a storage location of the target file to a range of storage locations that comprise the protected volume, and to determine that the storage location of the target file is in the protected volume based on the comparison.

7. The computing system of claim 6 wherein the request is to access a file in a file system, with an attached driver stack of loaded filter drivers that are loaded into the server kernel and executed by the server kernel.

8. The computing system of claim 1 wherein at least one of the call interception logic, the target analysis logic, or the call blocking logic comprises a filter driver in a driver stack attached to the file system.

9. The computing system of claim 1 wherein
the target analysis logic is configured to:
based on a determination that the target file is a driver file that stores code configured to deploy a driver on the computing system,
compare the driver file to the set of entries in the whitelist file, and
determine that the driver file is not authorized by the whitelist file based on the comparison; and
the call blocking logic is configured to:
block the request from being executed based on the determination that the driver file is not authorized.

10. The computing system of claim 1 wherein
the request comprises a first request;

the data accessing logic is configured to receive a second request to perform an operation on data stored on the data storage device;

the call interception logic is configured to:
intercept the second request before the second request is executed;
based on determining the second request is a file open request to open a second target file, determine that the second target file is a driver file that stores code configured to deploy a driver on the computing system;

the target analysis logic is configured to
compare the driver file to the set of entries in the whitelist file, and
determine that the driver file is not authorized by the whitelist file based on the comparison;

the call blocking logic is configured to block the second request from being executed based on the determination that the driver file is not authorized by the whitelist file.

11. A method performed by a server kernel, the method comprising:
receiving a request to perform an operation on data stored on a data storage device;
identifying, before the request is executed, that the request is a file open request to open a target file and determining that the target file is not a driver file that stores code configured to deploy a driver on a computing system;
identifying a storage location where the target file is stored;
determining that the storage location is in a protected location including a whitelist file that stores a set of entries that identify a set of authorized driver files; and
blocking the request from being executed based on the determination that the storage location is in the protected location.

12. The method of claim 11, wherein the request comprises a first request, and further comprising:
receiving a second request to perform an operation on data stored on the data storage device;
intercepting the second request before the second request is executed;
based on determining the second request is a file open request to open a second target file, determining that the second target file is a driver file that stores code configured to deploy a driver on the computing system;
comparing the driver file to the set of entries in the whitelist file;
determining that the driver file is not authorized by the whitelist file based on the comparison; and
blocking the second request from being executed based on the determination that the driver file is not authorized by the whitelist.

13. The method of claim 12 wherein determining that the driver file is not authorized by the whitelist file comprises:
comparing a driver file identifier, that identifies the driver file, with entries in the whitelist file to determine whether the driver file identifier is identified by an entry in the whitelist file.

14. The method of claim 11 wherein determining that the storage location is in a protected location that includes the whitelist file comprises:

comparing a storage location of the target file to a range of storage locations that comprise the protected volume; and
determining that the storage location of the target file is in the protected volume based on the comparison.

15. The method of claim 14 wherein the request is to access a file in a file system, with an attached driver stack of loaded filter drivers that are loaded into the server kernel, for execution by the server kernel.

16. The method of claim 14 wherein determining whether the target file is a driver file comprises:
providing the request to a filter driver in the driver stack attached to the file system; and
executing the filter driver.

17. The method of claim 15 wherein identifying a storage location where the target file is stored, determining whether the driver file is authorized by a whitelist file, and determining whether the storage location is in a protected location that includes the whitelist file comprises:
providing the request to a filter driver in the driver stack attached to the file system; and
executing the filter driver.

18. A computing system, comprising:
at least one processor; and
memory storing instructions executable by the at least one processor, wherein the instructions provide a server kernel configured to:
receive a request to perform an operation on data stored on a data storage device;
based on determining that the request is a file open request to open a target file, intercept the request before the request is executed;
determine whether the target file is a driver file based on an identified type of the target file;
identify a storage location where the target file is stored;
based on a determination that the target file is a driver file,
determine whether the driver file is authorized by a whitelist file that stores a set of entries that identify a set of authorized driver files, and
block the request from being executed based on a determination that the driver file that is not authorized by the whitelist file;
based on a determination that the target file is not a driver file, block the request from being executed based on a determination that the storage location is in a protected location that includes the whitelist file.

19. The computing system of claim 18 wherein the server kernel is configured to:
access the whitelist file and compare a driver file identifier that identifies the driver file with entries in the whitelist file to determine whether the driver file identifier is identified by an entry in the whitelist file and generate an authorization output indicating that the driver file is authorized by the whitelist file.

20. The computing system of claim 19 wherein the server kernel is configured to:
compare a storage location of the target file to a range of storage locations that comprise the protected volume, to determine whether the storage location of the target file is in the protected volume and generate an authorization output indicating that the target file is not stored in the protected volume.

* * * * *